US006211869B1

(12) United States Patent
Loveman et al.

(10) Patent No.: US 6,211,869 B1
(45) Date of Patent: Apr. 3, 2001

(54) SIMULTANEOUS STORAGE AND NETWORK TRANSMISSION OF MULTIMEDIA DATA WITH VIDEO HOST THAT REQUESTS STORED DATA ACCORDING TO RESPONSE TIME FROM A SERVER

(75) Inventors: Jason S. Loveman, San Jose; Mark S. Allen, Sunnyvale; Ronald White, Lake Forest; Charles E. Haynes, San Francisco, all of CA (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/322,810

(22) Filed: May 27, 1999

Related U.S. Application Data

(63) Continuation of application No. 09/173,815, filed on Oct. 16, 1998, now abandoned, which is a continuation of application No. 09/019,945, filed on Feb. 6, 1998, now abandoned, which is a continuation of application No. 08/832,868, filed on Apr. 4, 1997, now abandoned.

(51) Int. Cl.[7] .................................................... G06F 3/00
(52) U.S. Cl. .......................................... 345/328; 725/98
(58) Field of Search .............................. 348/12, 7, 384; 348/423, 722; 710/5–7, 36, 37, 39, 40; 345/328; 707/10

(56) References Cited

U.S. PATENT DOCUMENTS

| 4,843,468 | * | 6/1989 | Drewery | 358/140 |
|---|---|---|---|---|
| 5,426,513 | * | 6/1995 | Scorse et al. | 358/433 |
| 5,581,784 | | 12/1996 | Tobagi et al. | 395/826 |
| 5,623,690 | | 4/1997 | Palmer et al. | 395/806 |
| 5,642,171 | | 6/1997 | Baumgartner et al. | 348/515 |
| 5,647,047 | | 7/1997 | Nagasawa | 386/52 |
| 5,706,290 | * | 1/1998 | Shaw et al. | 370/465 |
| 5,708,960 | * | 1/1998 | Kamisaka et al. | 455/3.2 |
| 5,710,895 | * | 1/1998 | Gerber et al. | 348/552 |
| 5,732,239 | | 3/1998 | Tobagi et al. | 395/441 |
| 5,734,925 | | 3/1998 | Tabagi et al. | 395/826 |
| 5,754,882 | | 5/1998 | Tobagi et al. | 395/826 |

OTHER PUBLICATIONS

Slice Transistion Maker Summary, The Brughetti Corporation, 1994 (14 pages).

* cited by examiner

Primary Examiner—Victor R. Kostak
(74) Attorney, Agent, or Firm—Kenneth L. Milik; Peter J. Gordon

(57) ABSTRACT

A digital multimedia newsroom production system allows users of the system to create, browse and catalog multimedia assets. The system includes a multimedia capture and encoding system that captures multimedia data, and substantially simultaneously provides a first compressed version of the multimedia data having a first resolution, and a second compressed version of the multimedia data having a second resolution that is different than the first resolution; a multimedia storage system, coupled to the multimedia capture and encoding system, that stores multimedia information including the first and second compressed versions of the multimedia data; and a video editing and playback system coupled to the multimedia storage system. The video editing and playback system includes editing circuitry that generates a composition that uses a portion of the first compressed version, and playback circuitry that plays the composition using a portion of the second compressed version that corresponds to the portion of the first compressed version. The multimedia storage system stores multimedia information including the compressed versions of the multimedia data, and provides to a network the first compressed version of the multimedia data substantially simultaneously as the first compressed version is stored.

24 Claims, 10 Drawing Sheets

SIMULTANEOUS STORAGE AND NETWORK TRANSMISSION OF MULTIMEDIA DATA WITH VIDEO HOST THAT REQUESTS STORED DATA ACCORDING TO RESPONSE TIME FROM A SERVER

CROSS-REFERENCE OF RELATED APPLICATION

This application is a continuing application of U.S. patent application Ser. No. 09/173,815, filed Oct. 16, 1998, now abandoned, which is a continuing application of U.S. patent application Ser. No. 09/019,945, filed Feb. 6, 1998, now abandoned, which is a continuing application of U.S. patent application Ser. No. 08/832,868, filed Apr. 4, 1997, now abandoned.

FIELD OF THE INVENTION

The present invention relates generally to a multimedia system with improved data management mechanisms, and more particularly to a method and apparatus for substantially simultaneously encoding multiple versions of a multimedia data signal, and providing substantially simultaneous access and storage of the multiple versions, a correspondence between the multiple versions being generated during storage.

BACKGROUND OF THE INVENTION

Over the last few decades, the process for producing broadcast news programs has undergone several changes. Increased competition brought about by the expansion of cable outlets and other news sources, and changes in technology, have forced news broadcasters to use their resources more effectively.

To produce a news program, a typical news production organization performs four major operations, which are illustrated in FIG. 1. In particular, the operations include video production 10, graphics production 12, text production 14 and on-air operations 16. Unfortunately, the results of these operations rarely are combined effectively until the actual broadcast of the news program.

Video production 10 includes generating and editing motion video for broadcasting using video information retrieved from a video archive or produced from various sources (e.g., cameras, either studio or field recorded). Text production 14 includes scripting and editing of text gathered from several sources including a text archive. Similar to video production 10 and text production 14, graphics production 12 includes generating and editing graphics data, such as titling and still images gathered from a variety of sources.

In order to produce a final news product for broadcast, results from video production 10, graphics production 12 and text production 14 must be properly integrated during the on-air operations 16. Existing news broadcast systems are capable of such integration. In particular, these systems permit complete management of the audio and video elements of the news program from acquisition, through editing, distribution and on-air play.

A conventional process for integrating the major operations is illustrated in FIG. 2. As shown in FIG. 2, a disk-based video production operation 30 is integrated with a media production process 32 and on air operations 34. The use of disk-based digital audio/video storage systems, digital networks, and digital non-linear editing systems has allowed for successful integration of video production, graphics production and on-air operations. Several products are available from Avid Technology, Inc., Tewksbury, Mass., for providing the integration process shown in FIG. 2.

The newsroom text production and management system 14 of FIG. 2 is the same text production and management system 14 shown in FIG. 1. Although newsroom computer systems have been in use for several years, these computer systems are predominantly text based, and have limited integration capabilities with tape-based or disk-based audio/video production systems. Newsroom computer systems, such as those previously available from BaSys, and now from Avid Technology under the name NetStation, have developed from systems which were developed to receive news agency copy and provide simple word processing and communications facilities. In more recent years, add-ons of various kinds have been developed which provide some integration of the text production operation with the audio/video production operation. However, only limited integration of the text and audio/video data has been achieved, thereby providing only limited multimedia capability.

In a typical news production organization, a journalist develops an idea for a story, and determines how various audio/video clips should be used in the story. Often, the journalist will preview audio/video footage that has been archived, and select portions of the archived footage, called clips, for use in the story. Then, the journalist provides instructions to an editor who edits the clips to produce a final form of the story that is suitable for broadcast.

In some instances, particularly if the story is complex, the journalist may wish to prepare a rough form of the story and provide the rough form to the editor for final preparation. A rough form of what the journalist expects for the final form of the story is better than verbal or hand written instructions. To this end, if the journalist wishes to incorporate video from a previous broadcast that is contained in a video tape archive, the journalist must request that the tape be retrieved manually, and must then review the tape in an edit bay or a similar location. The journalist may then perform some preliminary editing of the archived video, with other material such as video of recent events, text and graphics received over news wire services, and archived text, before providing the rough form to the editor and instructing the editor to prepare the final form of the story for broadcast. In present day systems, the capability to perform the above-identified functions is not available to the journalist in a newsroom system, but as discussed above, must be performed remotely, for example, in an edit bay.

Furthermore, a journalist may wish to prepare a story about a particular event while the event unfolds. If the journalist has access to a live feed of the event, it is likely that the journalist will record the event on a video tape using a video tape recorder (VTR), or in a file on a disk using a non-linear disk-based audio/video production system. If the journalist is recording the event on video tape and wishes to prepare a rough form of the story by integrating recorded portions of event, the journalist must stop the VTR, and rewind the video tape to the specific recorded portions intended for integration. If new developments occur while the journalist is using the VTR to integrate the recorded portions, the live feed of these new developments will be lost unless the live feed is recorded simultaneously on a second tape using a second VTR. Similarly, if the journalist is using a conventional non-linear disk-based audio/video production system to record the live feed in a file, the journalist must terminate the recording before the journalist can access the recorded portions from the file for integration into the story. To record additional developments of the event on the disk-based system, the journalist must record the additional developments into a second file. Storage of the event among multiple tapes and files is inefficient and requires additional overhead to keep track of multiple tapes and files.

SUMMARY OF THE INVENTION

An embodiment of the invention is directed to a multimedia system that includes a multimedia capture and encoding system that captures multimedia data, and provides a first compressed version of the multimedia data having a first resolution and a second compressed version of the multimedia data having a second resolution that is different from the first resolution. The multimedia system further includes a multimedia storage system, coupled to the multimedia capture and encoding system, that stores multimedia information including the first and second compressed versions of the multimedia data. The multimedia system further includes a video editing and playback system coupled to the multimedia storage system. The video editing and playback system includes editing circuitry that generates a composition that uses a portion of the first compressed version, and playback circuitry that plays the composition using a portion of the second compressed version that corresponds to the portion of the first compressed version.

Another embodiment of the invention is directed to a multimedia system that includes a multimedia capture and encoding system that captures multimedia data, and provides a compressed version of the multimedia data having a first resolution. The multimedia system further includes a multimedia storage system, coupled to the multimedia capture and encoding system that stores multimedia information including the compressed version of the multimedia data, and provides to a network the compressed version of the multimedia data substantially simultaneously as the compressed version is stored.

According to an embodiment of the invention, the multimedia storage system includes a server coupled to the network that sends the compressed version on the network.

According to another embodiment, the multimedia system further includes a video host coupled to the network that sends a first request to the server for a first portion of the compressed version of the multimedia data, determines an amount of time to wait based on a length of the first portion and a response time of the first request, and sends a second request to the server for a second portion of the compressed version of the multimedia data after waiting the determined amount of time.

BRIEF DESCRIPTION OF THE DRAWINGS

For a better understanding of the present invention, reference is made to the accompanying drawings which are incorporated herein by reference and in which.

DETAILED DESCRIPTION

Figure 1:
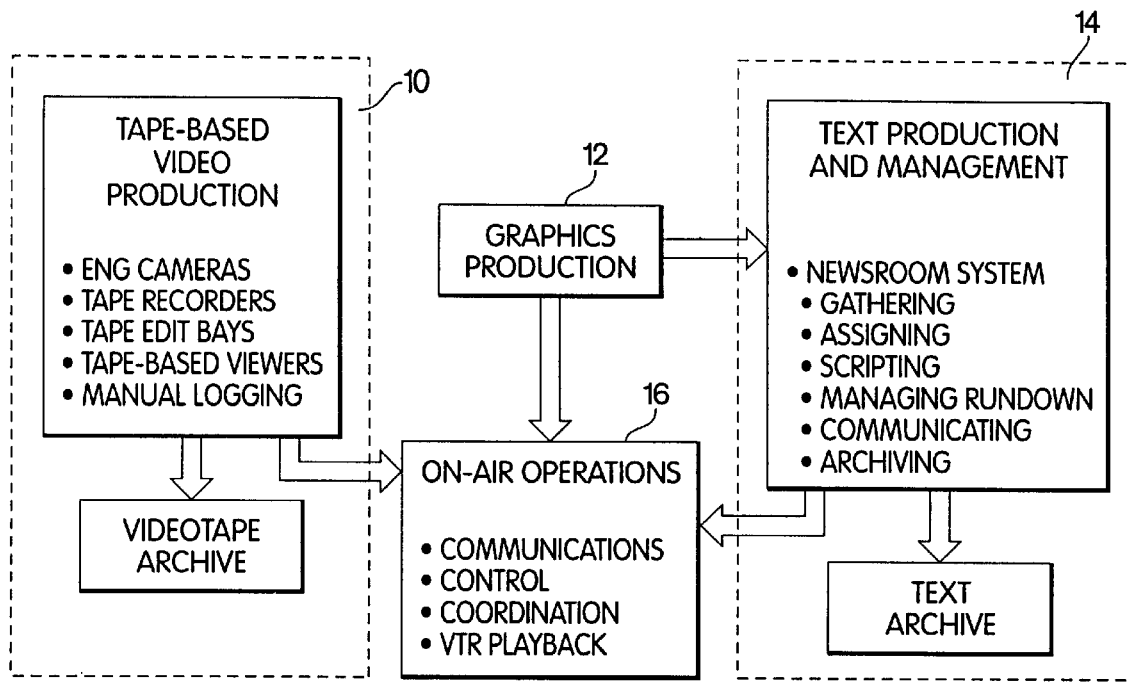
FIG. 1 is a block diagram illustrating components of a typical television news operation.
Figure 2:
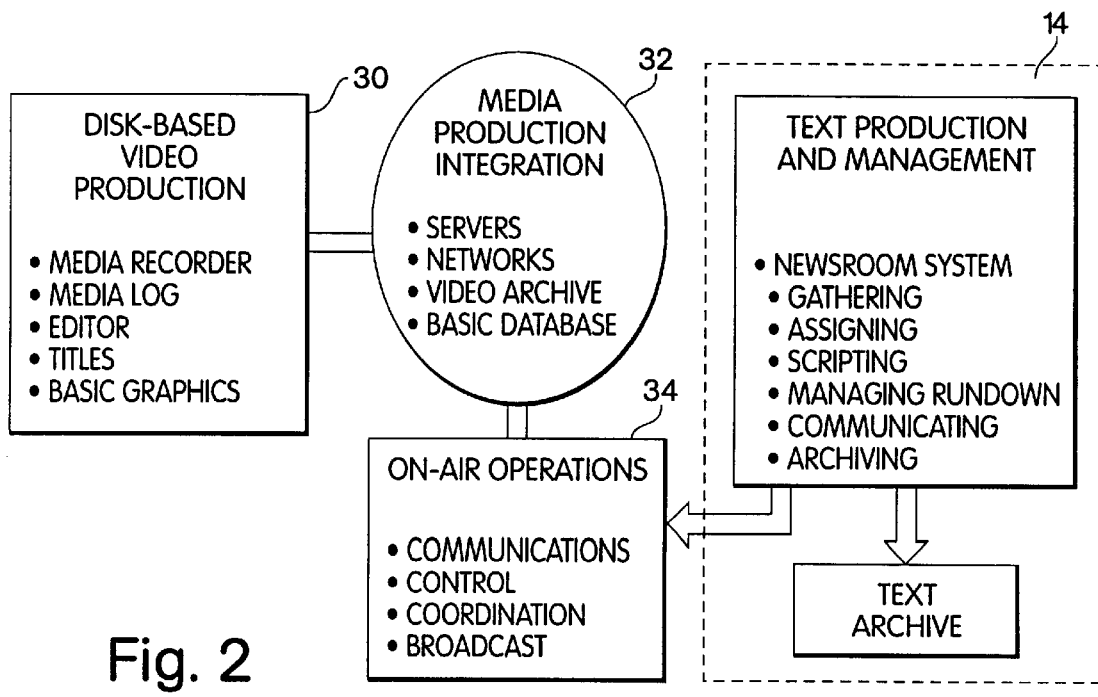
FIG. 2 is a block diagram illustrating components of a typical television news operation having audio/video production capabilities integrated with on-air operations.
Figure 3:
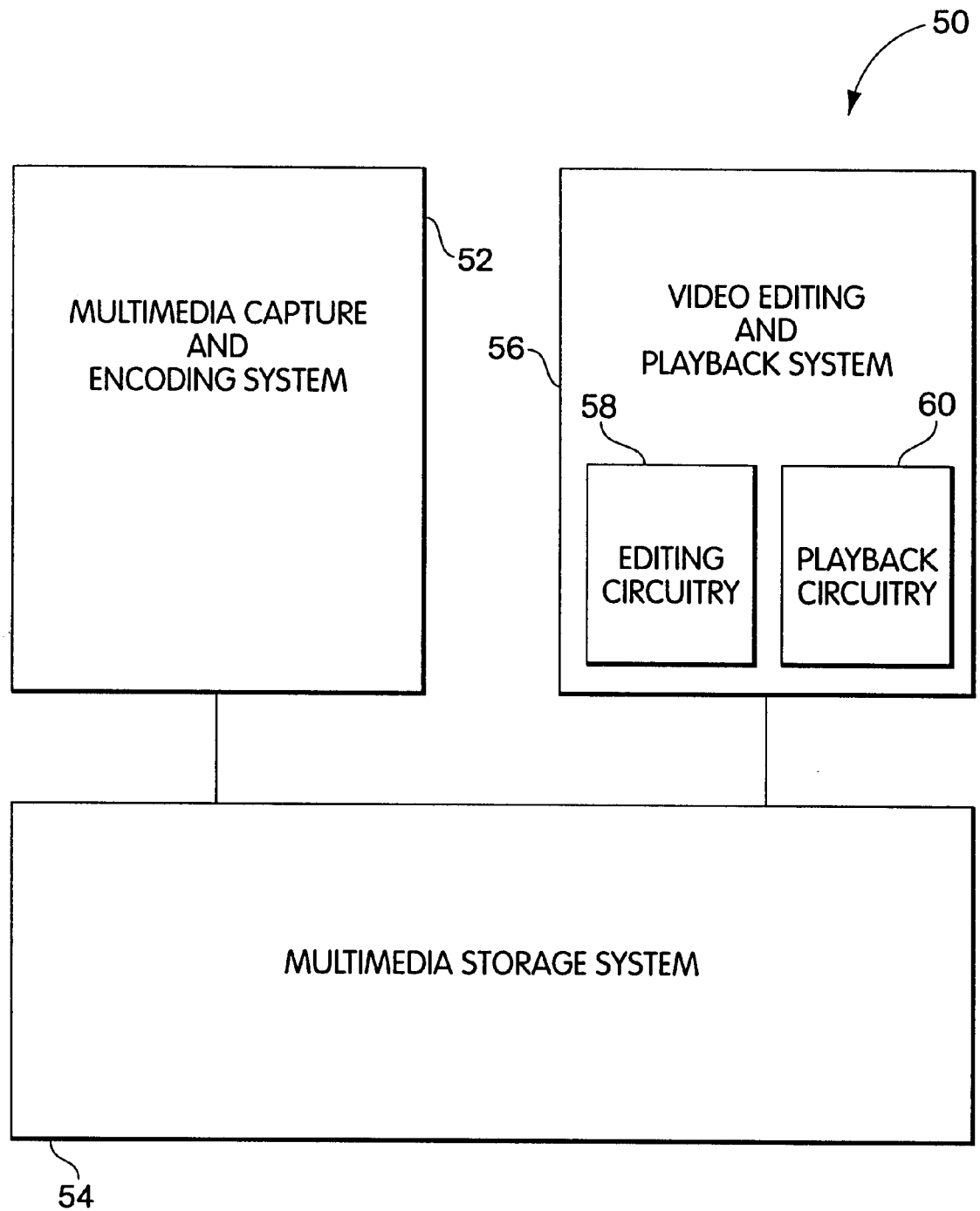
FIG. 3 is a block diagram of a digital multimedia system according to an embodiment of the present invention.

FIG. 3 shows a digital multimedia system 50 for managing motion video data in accordance with an embodiment of the invention. The multimedia system 50 enables one or more users to manipulate effectively motion video data, text, graphics and audio (i.e., multimedia data) and generate a multimedia composition. In particular, the system 50 substantially simultaneously encodes a low resolution version and a high resolution version of multimedia data. A journalist using the system generates a composition using a portion of the low resolution version, and an editor plays the composition using a portion of the high resolution version that corresponds to the portion of the low resolution version.

The multimedia system 50 includes a multimedia capture and encoding system 52 that captures multimedia data, and substantially simultaneously provides the first compressed version of the multimedia data having the first resolution, and the second compressed version of the multimedia data having the second resolution that is different than the first resolution.

The multimedia system further includes a multimedia storage system 54, coupled to the multimedia capture and encoding system 52, that stores multimedia information including the first and second compressed versions of the multimedia data. In particular, the multimedia storage system 54 includes a digital computer-readable and writable non-volatile random-access medium, such as a magnetic disk, for storing the first and second compressed versions digitally and non-linearly.

The multimedia system 50 further includes a video editing and playback system 56 coupled to the multimedia storage system 54. The video editing and playback system 56 includes editing circuitry 58 that generates a composition that uses a portion of the first compressed version, and playback circuitry 60 that plays the composition using a portion of the second compressed version that corresponds to the portion of the first compressed version. The composition includes one or more data structures that define a list of video entries. Each video entry indicates a name of a file containing video information, and a range of the file that defines a portion of the video information. The editing circuitry 58 and the playback circuitry 60 are typically used by a journalist and an editor, respectively. Alternatively, both the editing circuitry 58 and the playback circuitry 60 may reside on a single graphics workstation.

Figure 4:
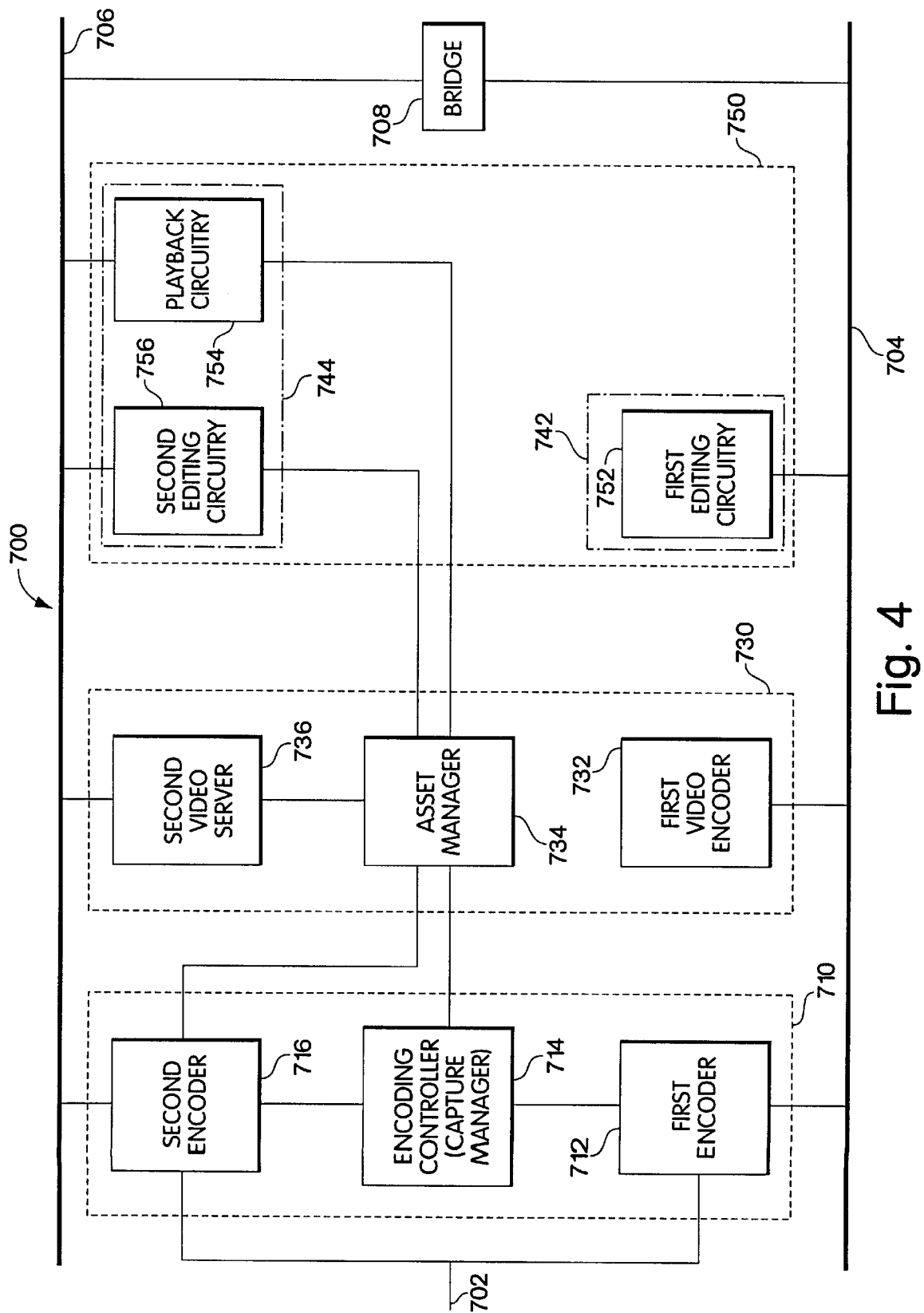
FIG. 4 is a block diagram of a digital multimedia system having a capture manager and an asset manager according to an embodiment of the present invention.

Another embodiment of the invention is a newsroom production system 700 which is illustrated in FIG. 4. The system 700 substantially simultaneously encodes a low resolution version and a high resolution version of multimedia data, and enables a journalist using the system to generate a composition using a portion of the low resolution version, and an editor to play the composition using a portion of the high resolution version that corresponds to the portion of the low resolution version. As in the embodiment of FIG. 3, the system 700 enables a news production organization to manipulate effectively multimedia data including motion video clips from a variety of sources, as well as text, live presentations by announcers and associated graphics.

The system 700 is similar to the system 50 described above in that the system 700 includes a multimedia capture and encoding system 710, a multimedia storage system 730 and a video editing and playback system 750. The system further includes a first computer network 704 and a second computer network 706 that are coupled to a bridge 708. Each of the multimedia capture and encoding system 710, the multimedia storage system 730, and the video editing and playback system 750 is coupled to the first network 704 and the second network 706. According to an embodiment of the invention, the network 706 is an ATM network such as AvidNet available from Avid Technology, Inc., Tewksbury, Mass., which is described in U.S. patent application Ser. No. 08/215,849, which is hereby incorporated by reference. The system 700 also includes an input 702 for receiving multimedia data, from one or more sources.

The multimedia capture and encoding system 710 includes a first encoder 712 coupled to the first network 704, a second encoder 716 coupled to the second network 706, and an encoding controller 714 interconnected between the encoders 712 and 716. The encoding controller 714 is also referred to as a capture manager. Each of the encoders 712 and 716 is further coupled to the video input 702 to receive the multimedia data.

The multimedia storage system 730 includes a first video server 732 coupled to the first network 704, a second video server 736 coupled to the second network 706, and an asset manager 734. The asset manager 734 is coupled to each of the second video server 736, the capture manager 714 and the second encoder 716.

The video editing and playback system 750 includes a first workstation 742 coupled to the first graphics network 704, and a second graphics workstation 744 coupled to the second network 706. The first graphics workstation includes first editing circuitry 752 coupled to the first network 704. The second graphics workstation includes playback circuitry 754 coupled to the second network 706, and second editing circuitry 756 coupled to the second network 706. Alternatively, the playback circuitry 754 and the second editing circuitry 756 may reside on separate graphics workstations each of which is coupled to the second network 706. Both the playback circuitry 754 and the second editing circuitry 756 are further coupled to the asset manager 734.

When the system 700 is in operation, the first and second encoders 712 and 716 substantially simultaneously receive a multimedia data signal from the input 702. The first encoder 712 outputs over the network 704 a signal containing a first compressed version of the multimedia data. The second encoder 716 outputs over the network 706 a signal containing a second compressed version of the multimedia data. The resolution of the first compressed version is different than the resolution of the second compressed version. In one embodiment, the first and second resolutions differ from a time perspective so that one of the versions uses less frames than the other over a given interval of time. In another embodiment, the first and second resolutions differ spatially, i.e., in the number of pixels used to represent a still image, so that one of the versions provides images of a better clarity than the other version. In yet another embodiment, the first and second resolutions differ both temporally, i.e., the number of images per second of motion video, and spatially. In a particular embodiment of the invention, the first compressed version is an MPEG-1 (ISO/IEC 11172-1 through 9) encoded stream, and the second compressed version is a 60 field per second motion-JPEG (MJPEG) encoded stream of broadcast television quality images so that the first and second compressed versions have different temporal and spatial resolutions.

The first video server 732 receives and stores the first compressed version from the first encoder 712. The second video server 736 receives and stores the second compressed version from the second encoder 716. Storage of the first and second compressed versions occurs substantially simultaneously. In a preferred embodiment, the first video server 732 is a low resolution video server that stores low resolution multimedia data such as Avid BrowseServer, and the second video server 736 is a high resolution video server that stores high resolution multimedia data such as Avid MediaServer. Both Avid MediaServer and Avid BrowseServer are motion video storage devices available from Avid Technology, Inc., Tewksbury, Mass. The capture manager 714 controls the asset manager 734 so that a correspondence between the first and second compressed versions is generated. In particular, the asset manager 734 initially creates and then maintains a mapping of the first and second compressed versions. In one embodiment, the mapping is achieved by storing file identification information and timecode data in a file. If a filename and timecode range identifying a portion of the first compressed version is provided to the asset manager 734, the asset manager can identify a portion of the second compressed version that corresponds to the portion of the first compressed version. In particular, the asset manager 734 searches the file and retrieves a filename and a timecode range identifying the portion of the second compressed version that corresponds to the portion of the first compressed version. Accordingly, correspondence between the first and second compressed versions is achieved.

Such a mapping mechanism may be implemented by using a form of dynamic linking as disclosed in U.S. patent application Ser. No. 5,267,351 to Reber et al., which is hereby incorporated by reference. In particular, the asset manager 734 may maintain indications of high resolution video files which are equivalent to low resolution files. This equivalency can be used to automatically and dynamically associate the appropriate high resolution files with the low resolution files used by the journalist to create a multimedia composition.

If timecode information is unavailable on the audio/video feed received by the input 702, the capture manager 714 ensures that timecode information is included in the encoded multimedia data. In particular, if timecode information is not included, either the capture manager 714 or the asset manager 734 adds timecode information to the second compressed version before it is stored in the second video server 736.

The operation of the system 700 will now be described in connection with a newsroom setting. A journalist in the newsroom operates the first workstation 742 and an editor operates the second workstation 744. The journalist generates a composition that uses a portion of the first compressed version of the multimedia data having the first resolution. It is not necessary that the composition be suitable for broadcast. Rather, the composition may be a rough form of the journalist's story that an editor can convert into a final form for broadcast. In particular, the journalist sends the representation of the composition (not including the media data) to the editor across the first and second networks 704 and 706 through the bridge 708. When the editor receives the composition, the editor can play the composition on the second workstation 744. When the second workstation 744 plays the composition, the second workstation plays a portion of the second compressed version of the multimedia data having the second resolution rather than the portion of the first compressed version used by the journalist. The editor converts the composition into the final broadcast form by performing editing operations, such as adding blend and fade transitions between audio/video portions and other special effects, using the second editing circuitry 756.

It should be understood that when the journalist generates the composition using the first workstation 742, the first compressed version of the multimedia data is transferred only through the first network 704. Similarly, when the editor plays the composition using the second workstation 744, the second compressed version of the multimedia data is transferred only through the second network 706.

Also, it should be understood that, using the system 700, neither the journalist nor the editor leaves their respective workstations to retrieve audio/video footage for integration into the composition. The journalist has access to the first compressed version stored in the first video server 732. Similarly, the editor has access to the second compressed version stored in the second video server 736.

Figure 5:
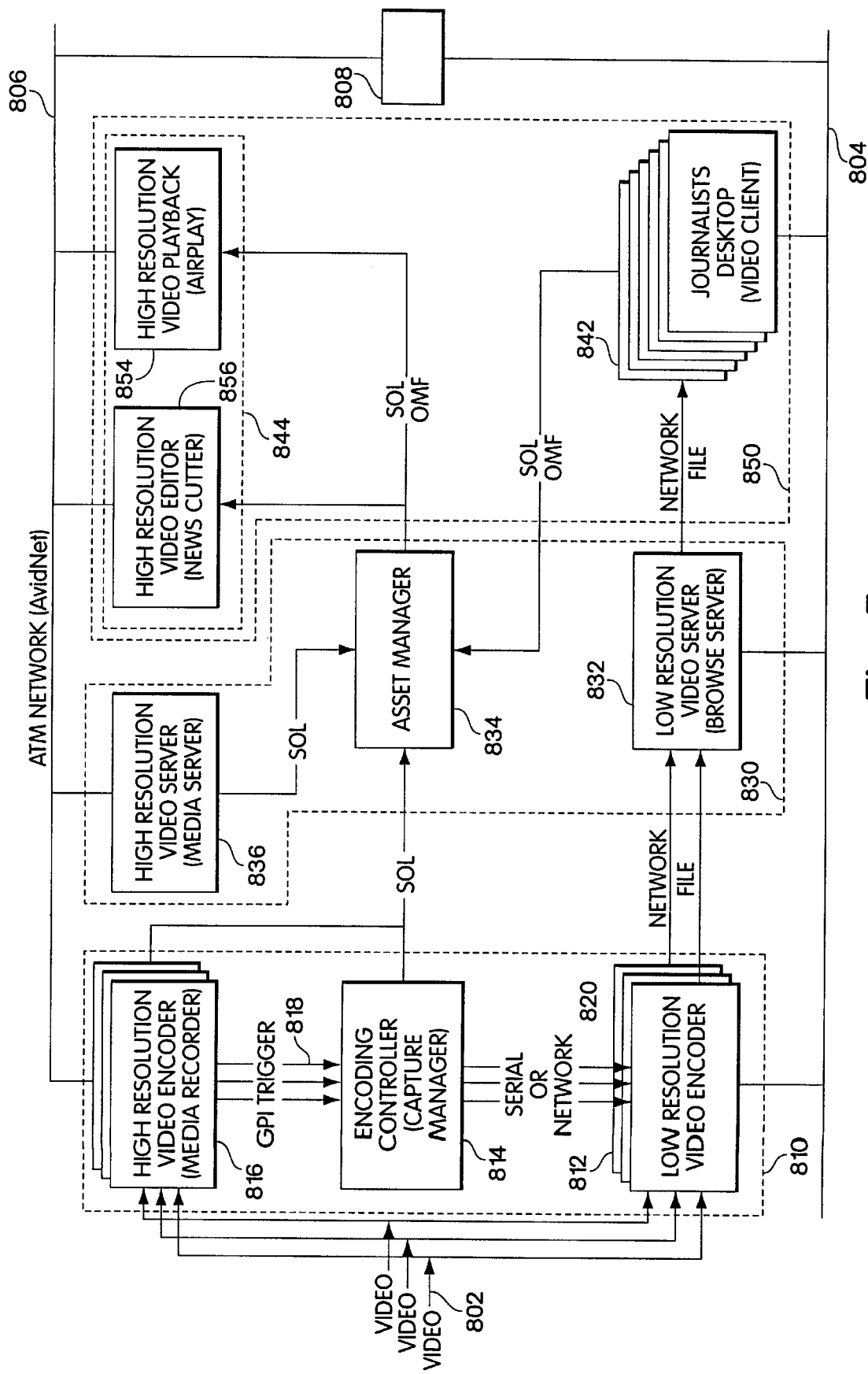
FIG. 5 is a block diagram of a digital multimedia system having multiple low resolution encoders and multiple high resolution encoders according to an embodiment of the present invention.

Another embodiment of the invention is directed to a newsroom production system 800 which is illustrated in FIG. 5. This embodiment is similar to the embodiment of FIG. 4 except that it includes multiple first encoders 812, multiple second encoders 816, and multiple first workstations 842. As in the other embodiments of the invention previously described, a news production organization can utilize effectively the system 800 to generate news stories that include broadcast quality motion video clips from a variety of sources. The encoders 812 are low resolution encoders that simultaneously output low resolution compressed versions of multimedia data from various sources. The encoders 816 are high resolution encoders that simultaneously output high resolution compressed versions of the multimedia data from the various sources.

A benefit of the system 800 is that the multimedia data transferred through the first network 804 is low resolution data which requires less bandwidth than high resolution data. Accordingly, several workstations 842 can be connected to the first network 804 without experiencing substantial degradation in performance of the first network 804. The multimedia data transferred through the second network 806 is high resolution data which uses more network bandwidth than low resolution data. Nevertheless, the second network 806 provides suitable performance since it is isolated from network traffic caused by the first workstations 842. Accordingly, more than one second workstation 844 may be connected to the second network 806. The bridge 808 allows certain signals to pass from one network to the other. In particular, the bridge 808 allows a journalist working on one of the first workstations 842 to send a generated composition, i.e., one or more data structures that define a story, to an editor working on one of the second workstations 844.

Since the system 800 includes more than one low resolution encoder 812 and more than one high resolution encoder 816, as illustrated in FIG. 5, the system 800 can capture, encode and store both low resolution and high resolution versions of more than one audio/video feed simultaneously. The capture manager 814 maintains control of the multiple encoding sessions simultaneously. For example, the input 802 may have a first terminal that is connected to a satellite feed so that the satellite feed can be encoded and stored by the system 800. The input 802 may have a second terminal that is connected to a live camera so that the camera feed can be encoded and stored simultaneously by the system 800.

Figure 6:
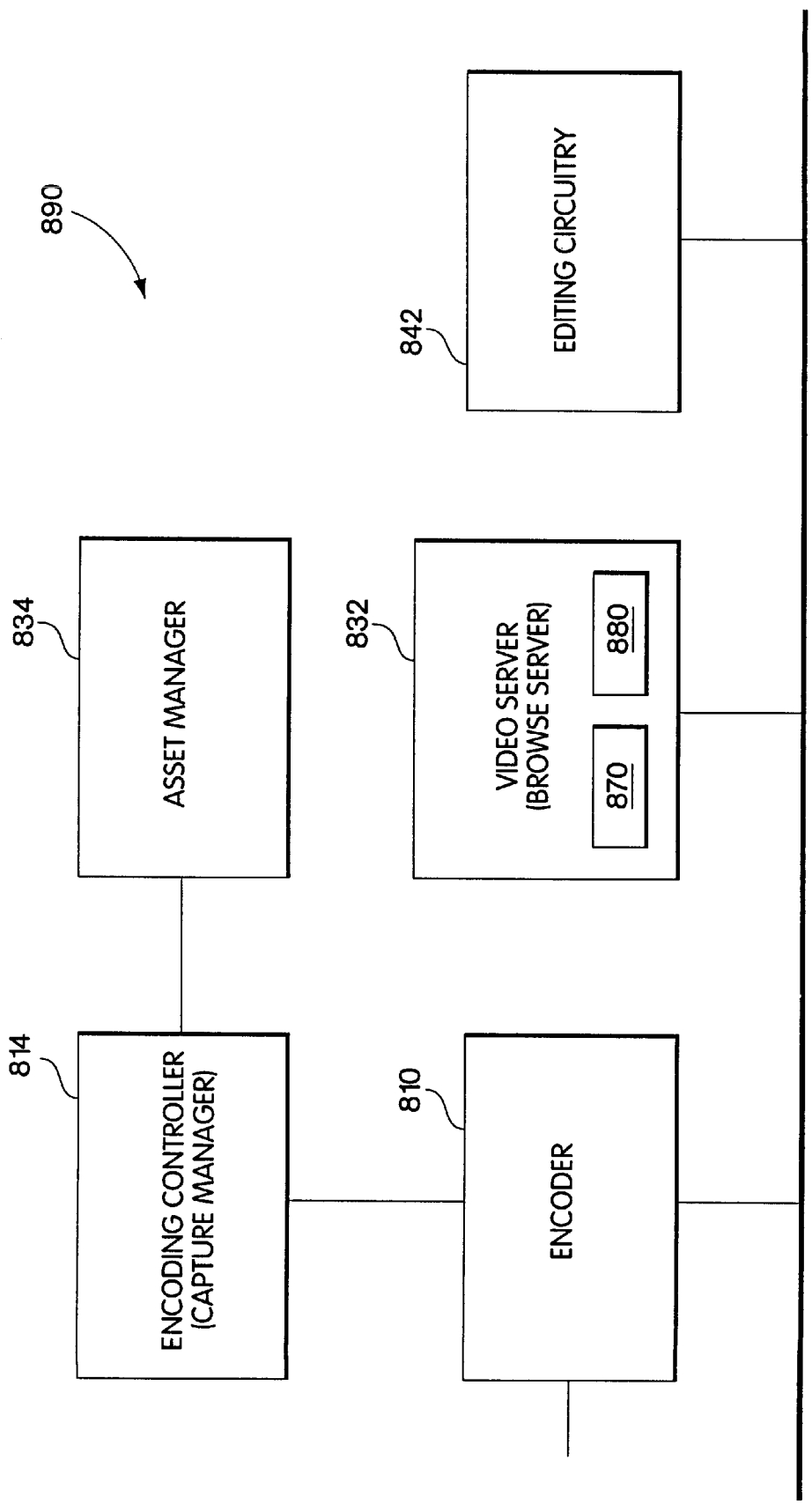
FIG. 6 is a block diagram of a digital multimedia system having a browse server according to an embodiment of the present invention.

According to embodiments of the invention, a user can view and edit an encoded version of an audio/video feed while the encoded version is being encoded and stored in a file on one of the video servers. In accordance with these embodiments, a system 890 includes an encoder, a browse server, and a workstation, as shown in FIG. 6. These devices can be a portion of the multicast system 800 of FIG. 5.

The first video server 832 illustrated in FIG. 5 is suitable as the browse server 832 in FIG. 6. The browse server 832 includes a buffer cache 870 and disk-based memory 880, as shown in FIG. 6. As the browse server 832 receives an encoded version of an audio/video feed from the low resolution video encoder 812, portions of the encoded version are initially cached in the buffer cache 870 by the browse server's operating system. The operating system writes, i.e., flushes these portions from the buffer cache 870 to a file on the disk-based memory 880. As the operating system writes the portions to the memory, the operating system simultaneously sends network packets including these portions onto the network 804 to one or more workstations 854 for viewing and possible editing if a request for the encoded version is received from the one or more workstations 854.

In one embodiment of the invention, the browse server 832 uses the Windows NT operating system available from Microsoft, Corporation, Redmond, Wash., which permits data to be stored into a file, and simultaneously read from the file without file contention problems. The system 890 utilizes file access operations provided by the Windows NT operating system so that multimedia data can be flushed from buffer cache 870 to the disk-based memory 880, and simultaneously sent to one or more workstations 842 through the network 804. In particular, according to an embodiment of the invention, the system utilizes a feature of the NT file system providing the ability to read data from a file while data is appended to the file.

In one embodiment, the portions are multicast (or "pushed") over the network 804, and any workstations 842 wishing to have access to the portions simply register a request with the browse server 832. Then, the browse server multicasts the portions to the workstations 842 over the network 804 using IP multicasting as the browse server simultaneously stores the portions.

In another embodiment, the browse server 832 responds specifically to individual requests for encoded portions, i.e., the portions are "pulled" from the browse server 832 to the workstation 842. In this embodiment, the browse server 832 functions as a web server by providing packets of information onto a computer network in response to individual requests from various workstations 842. In particular, when a workstation 842 wishes to receive a portion of the encoded version of multimedia data, the workstation 842 sends a request onto the network 804 that is received by the browse server 832. The browse server 832 responds by sending a network packet containing a portion of the encoded version back to the workstation 842 substantially simultaneously as the encoded version is stored into a file on the browse server 832.

Figure 7:
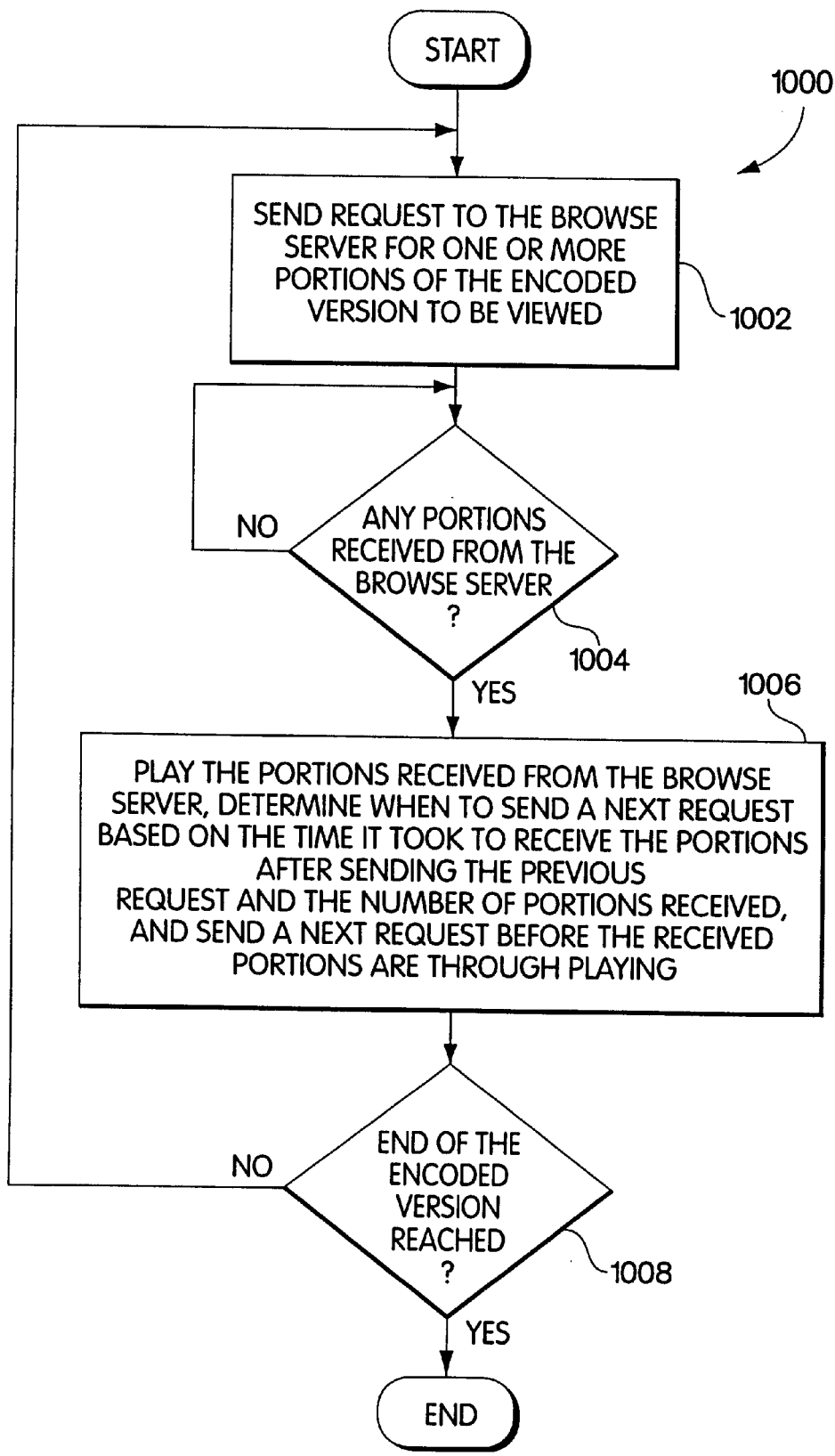
FIG. 7 is a flow diagram of a method performed by a video host of a digital multimedia system, according to an embodiment of the present invention.

In accordance with an embodiment of the invention, the workstation 842 performs the method 1000 illustrated in FIG. 7. In step 1002, the workstation 842 sends a request to the browse server 832 for one or more portions of the encoded version that is being simultaneously stored in the browse server 832. In step 1004, the workstation 842 waits until it receives portions of the encoded version from the browse server 832 in response to the request. In step 1006, the workstation 842 receives and plays one or more portions, and determines when to send a next request for more portions. The time for sending a next request depends on both the amount of video data received, e.g., the number of portions, and the time it took between sending the request and receiving the data. In step 1006, the workstation sends the next request expecting to receive one or more new portions of the encoded version a predetermined amount of time before the workstation 842 is through playing the earlier received portions. Accordingly, the workstation 842 attempts to maintain some predetermined amount of lead time. In one embodiment, this lead time is approximately 0.5 seconds so that the workstation 842 sends the next request expecting that the next portions will be received 0.5 seconds before the previous portion is through playing. In step 1008, the workstation 842 checks whether the end of the file that stores the encoded version has been reached. If so, the method 1000 terminates. Otherwise, the workstation 842 repeats the method 1000.

In accordance with an embodiment of the invention, the workstation 842 uses an active reader thread to acquire the new portions. If more than 6 seconds worth of material is stored by the workstation 842, the reader thread sleeps for a predetermined amount of time or until it is activated.

Figure 8:
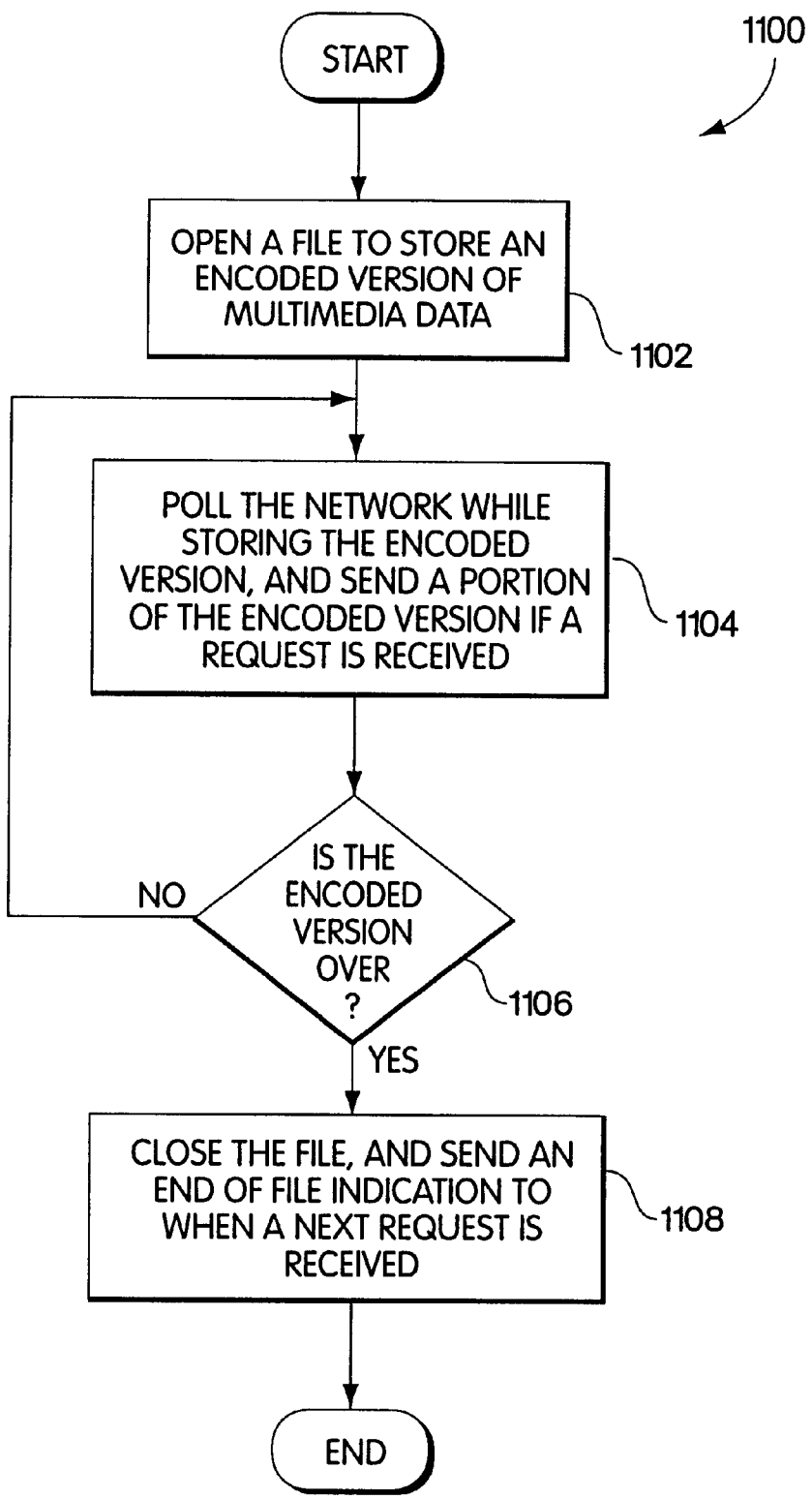
FIG. 8 is a flow diagram of a method performed by a browse server of a digital multimedia system, according to an embodiment of the invention.

In accordance with an embodiment of the invention, the browse server 832 performs the method 1100 illustrated in FIG. 8. In step 1102, the browse server 832 opens a file to store the encoded version of multimedia data. In step 1104, the browse server 832 polls the network 804 for requests for portions of the encoded version, and when a request is received from the workstation 842, the browse server 832 sends one or more portions of the encoded version to the workstation 842. The browse server 832 can track which portions of the encoded version have been sent to the workstation 842 and which portions to send in response to the next request. In particular, if the workstation 842 includes an identification ID with its request, the browse server 832 can use the ID to find determine which file and which read block need to be accessed, and then send the read block and other information such as timecode and length information of the portion or portions of the encoded version defined by the read block. Alternatively, the workstation 842 tracks which portions of the encoded version are needed next, and sends an indication of which portions it needs with the next request. In step 1106, the browse server 832 determines whether the encoded version has been completely stored, e.g., whether the encoder 812 has been stopped. If so, the browse server 1106 proceeds to step 1108 and closes the file, and sends an end of file indication along with any remaining unsent portions when a next request is received from the workstation 842. Otherwise, the browse server 832 proceeds to step 1104 to continue polling the network and storing the encoded version in the file.

It should be understood that the workstation 842 may be an Internet client by having an IP address, and the browser server 832 is effectively a server, such as an http server or other kind of server that uses the TCP/IP protocol. According to a preferred embodiment, communications between the workstation 842 and the browse server 832 are "connectionless." That is, the requests sent from the workstation 842 to the browse server 832 establish a connection only for the period of time required to transmit network packets of the request. Similarly, another connection is established between the browse server 832 and the workstation 842 for transfer of one or more portions of the encoded version across the network 804. Otherwise, no connection exists, i.e., no connection stream remains open.

In one embodiment, http server software may be used by the browse server 832 to handle responses from the workstations 842 which are configured as web hosts. Such software is Microsoft Internet Information Server, or Microsoft Peer Web Services, available from Microsoft, Corporation, Redmond, Wash.

Using either of the foregoing embodiments, a journalist working at the workstation 842 may view and edit an encoded version of the multimedia data while it is being stored in the browse server 832. Accordingly, the journalist may prepare a composition that includes portions of an encoded version of multimedia data, while the multimedia data is being simultaneously stored in a browse server. Furthermore, the journalist is not burdened with having to store the encoded version in multiple files on the same browse server 832. Portions of the encoded version on the workstations 842 can be accessed with a maximum of 5 seconds of delay from the time the audio/video feed is first provided to the input 802.

Figure 9:
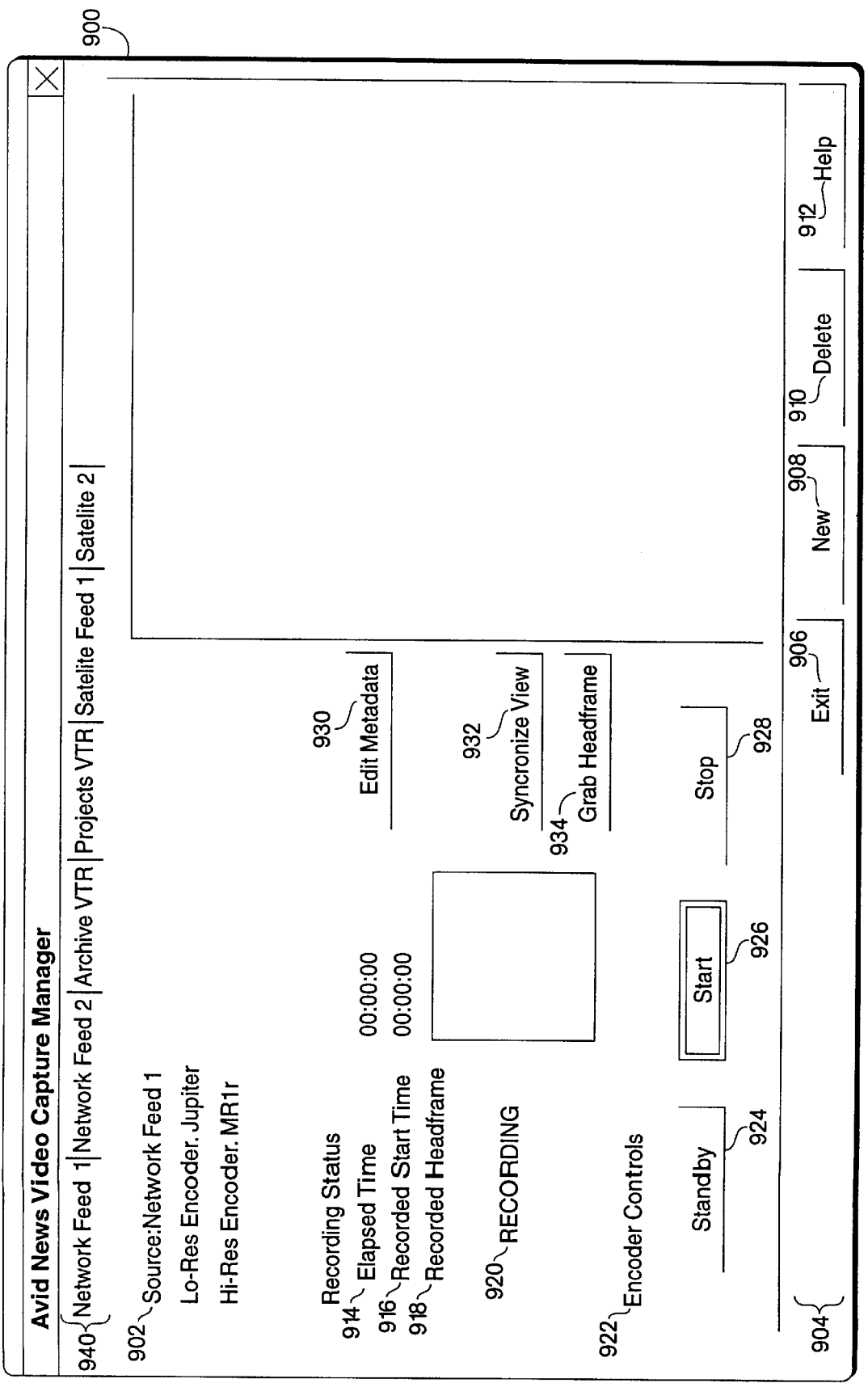
FIG. 9 is a view of a dialog window of a capture manager of a digital multimedia system according to an embodiment of the present invention.

Each journalist may create a recording session and maintain control of the recording session using a graphical user interface of the capture manager 814. This user interface also includes some access features (e.g., viewing and editing capabilities described above) allowing the journalist to access portions of an encoded version as the encoded version is being simultaneously recorded and stored. An example of the graphical user interface is illustrated in FIG. 9. The interface is in the form of a dialog window 900 that includes one or more property page displaying one or more respective encoding configurations. Each property pages includes buttons that enable the user to send commands and information to the capture manager 814 using conventional input methods with a mouse and a keyboard. Other conventional input mechanisms can be substituted for the mouse and keyboard. In the particular example shown in FIG. 9, the dialog window 900 has six property pages named: Network Feed1, Network Feed2, Archive VTR, Projects VTR, Satellite Feed1, and Satellite Feed2. The property page for Network Feed1 is shown as being presently in the foreground by "Network Feed1" being displayed as the source 902. The other property pages are shown in the background by tables 940 with their respective names. In this particular example, the high resolution encoder 816 is named "Jupiter" and the low resolution encoder is named "MR1". The bottom area 904 of the dialog window 900 displays a plurality of buttons including an "Exit" button 906 for exiting the graphical user interface of the capture manager 814, a "New" button 908 for creating a new property page for a new encoding configuration, a "Delete" button 910 for deleting a property page, and a "Help" button 912 for obtaining help through a help window (not shown).

The dialog window 900 further displays recording status information including an elapsed time 914 of the encoding session, a start time 916 that is assigned to the encoded version of the multimedia data being stored, a recorded headframe 918 that is used as a graphical image representation of the encoded version, and a flashing status 920 that indicates a current state of the encoding session.

The dialog window 900 further displays additional control buttons depending on the configuration of the encoding session as identified by its property page. For example, as shown in FIG. 9, the Network Feed1 property page includes encoder control buttons 922: "Standby" 924, "Start" 926 and "Stop" 928, that allow the user to respectively pause, start and stop an encoding session. The Network Feed1 property page further includes a "Previewer" (not shown) that allows the user to view progress of the encoding session, a "Synchronizer" 932 that allows the user to advance to the end of the currently encoded video to view the latest results of the encoding session, a "Metadata Edit Controller" 930 that allows the user to view and modify portions of the encoded version, and a "Headframe Grabber" 934 that allows the user to select, as the headframe for the encoded version, any frame in the encoded version that has been stored.

Some of the operations of the capture manager 814 will described in further detail. Each of the property pages in the dialog window 900 is tabbed, as shown in the area 940 of FIG. 9. When the user selects one of the tabs, the capture manager 814 displays the property page associated with the selected tab in the foreground of the dialog window 900. If the user cannot find an appropriate configuration to select and determines that a new configuration is needed, the user may create a new configuration and a new property page associated with the new configuration by pressing the "New" button 908. The capture manager 814 will respond by prompting the user for information regarding the new configuration until it has enough information to begin a new encoding session. The capture manager 814 begins encoding when the user selects the "Start" button 926. In particular, the capture manager 814 sends a signal to the low resolution encoder 812 through connection 820 (see FIG. 5) causing it to begin encoding. Alternatively, the capture manager 814 sends this signal to the low resolution encoder 812 when the capture manager 814 receives a signal from the high resolution encoder 816 through connection 818 indicating that the high resolution encoder 816 has started encoding. Accordingly, if the user has started the high resolution encoder 818, the low resolution encoder 812 is started automatically and simultaneously.

It should be understood that the user interface enable a journalist to control multiple live feeds simultaneously from one graphics workstation. When an operation is desired for one of the encoding sessions, the journalist brings the property page for that encoding session to the foreground in the dialog window 900 and performs the desired operations. Then, the journalist can perform an operation on a different encoding session by bring it to the foreground.

The journalist using the capture manager's dialog window 900 can view any portion of the encoded version as long as it has been stored in a file in the browse server 832. In particular, the journalist may jump to the beginning of the version, jump to the middle of the version, and jump to the end of the version. All of these access methods can occur while browse server 832 continues storing additional portions of the encoded version in the same file.

Furthermore, the journalist may add markers to the portions of the encoded version in real time. The journalist is not required to wait until an encoding session is over before viewing and marking multimedia data.

Figure 10:
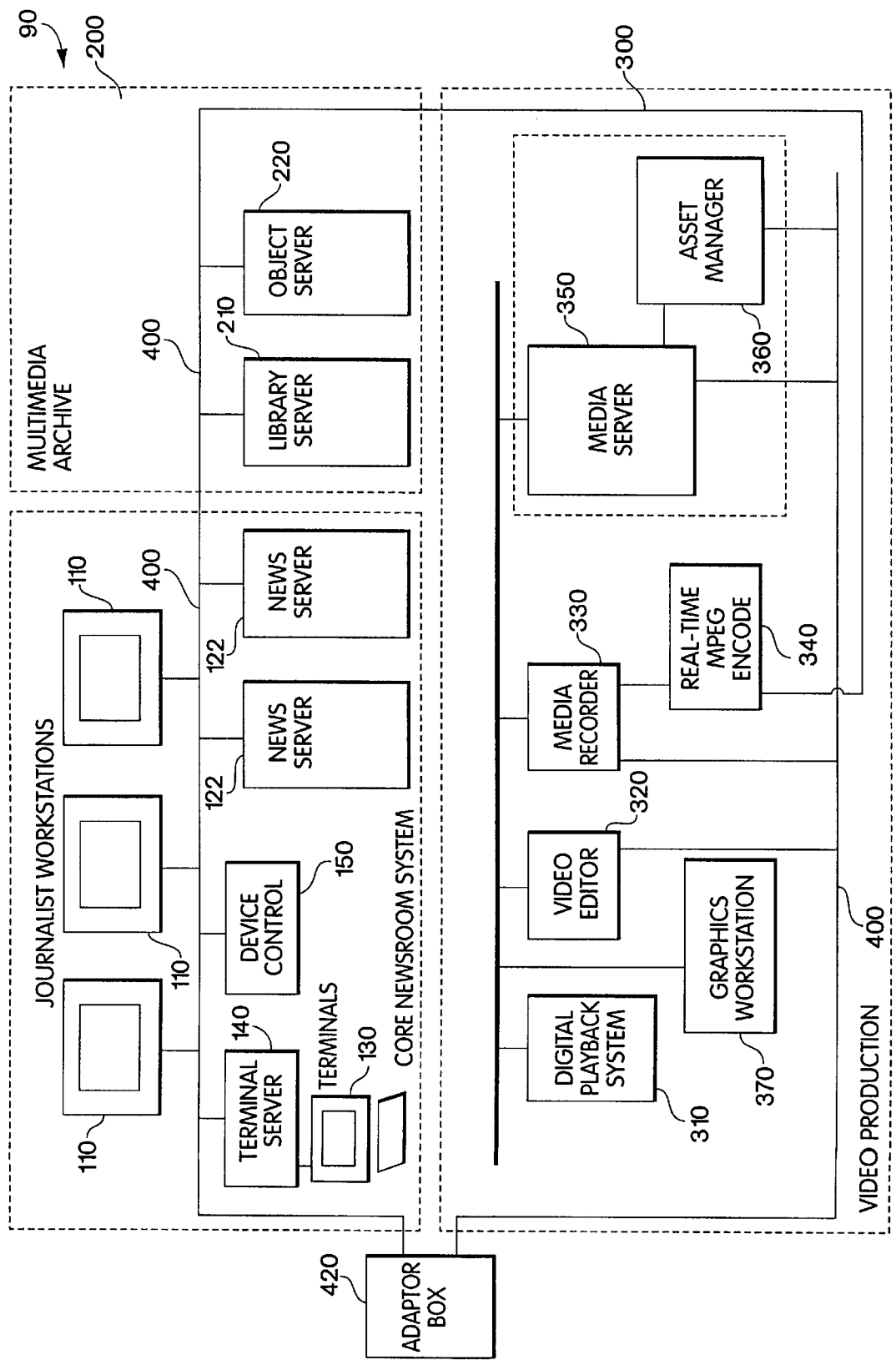
FIG. 10 is a block diagram of a digital multimedia system having a core newsroom system, a multimedia archive, and a video production system, according to an embodiment of the present invention.

Another embodiment of the invention is directed to a multimedia newsroom production system 90, as illustrated in FIG. 10. This system is described in U.S. patent application Ser. No. 08/631,441, filed on Apr. 12, 1996, which is hereby incorporated by reference. The newsroom production system 90 enables a news production organization to manipulate effectively multimedia data to generate news stories for broadcasting. Each generated news story may include several broadcast quality motion video clips from various sources. The system 90 includes three major systems, a core newsroom system 100, a multimedia archive 200, and a video production system 300.

In one embodiment, the components of the systems are interconnected through a single digital network. Preferably, the single digital network is a 100 Mb/s network.

In another embodiment, the components of the core newsroom system and the multimedia archive are interconnected using a first digital network 400, and the components of the video production system are interconnected with a second digital network 410. An adaptor box 420 is connected to both the first digital network 400 and the second digital networks 410 to enable communication between the two networks. In a preferred embodiment of the invention, the first digital network 400 is implemented using an Ethernet system having a data rate equal to, or greater than, 100 Mb/s, and the second digital network 410 is implemented using an Ethernet system having a data rate equal to, or greater than, 10 Mb/s. The adaptor box 420 may be implemented using one of a number of commercially available products such as a FastNet 10 available from Cabletron Systems, Inc, Rochester, N.H.

Each of the major components of the newsroom production system 90 is described in greater detail below.

VIDEO PRODUCTION SYSTEM 300

The video production system 300 provides audio/video capture, media data editing, and management and control of high quality multimedia data suitable for broadcast. The multimedia data can be any form of information that can be represented in a digital form. The video production system includes a digital playback system 310, a video editor 320, a media recorder 330 connected to an MPEG encoder 340, a media server 350 including an asset manager 360, a high bandwidth data network 364, and a graphics workstation 370.

The media server 350 is a large scale computer that stores and delivers high quality audio and motion JPEG video (MJPEG), suitable for broadcast, in conjunction with the other devices of the video production system 300. The media server 350 can also function as an archive system for multimedia data produced in the video production system 300. In a preferred embodiment of the invention, additional near-line storage and off-line storage is provided on a digital data storage medium, such as tape or optical disks, to relieve the media server of archive responsibilities to provide additional on-line storage capabilities within the media server 350.

An asset manager 360 is an integral part of the media server 350 and is implemented as software in the media server 350. The asset manager 360 stores information and is the tool used to manage the data stored in the near-line storage and the off-line storage. The material stored in the media archive can be automatically moved to on-line status on the media server by the asset manager 360. The asset manager 360 contains search support data for locating media objects stored in the media server 350, in the near-line storage system and in the off-line storage system. The asset manager 360 also contains composition information that can be used to capture, edit, and play back the media objects stored in the media server 350. As described below in greater detail, the media server 350 also provides translation of low resolution media data compositions, generated within the core newsroom system, to high resolution media data compositions for editing and playback within the video production system. In a preferred embodiment, the media server 350 is implemented using an Avid MediaServer™ available from Avid Technology, Inc., Tewksbury, Mass.

The media recorder 330 is a disk-based digital recording workstation which is used to capture audio/video data and provide digitization and compression of the audio/video data. The media recorder 330 digitizes, compresses and records audio/video material and transmits the digitized compressed data to the media server over the high speed network for storage on the media server 350.

In a preferred embodiment of the invention, the media recorder 330 uses an MJPEG encoding scheme to generate high quality, high resolution, compressed digital data suitable for broadcast. In the preferred embodiment, an MPEG encoder 340 is coupled to the media recorder 330 to also provide MPEG compression capability. As described in greater detail below, the addition of the MPEG encoder 340 to the media recorder 330 provides the system with a dual-digitizing capability for media data recorded by the media recorder 330. The MPEG encoder provides greater compression of the data than the media recorder 330, thereby allowing the data to be efficiently transmitted over the Ethernet network 400 to be played on the journalist workstations 110. As shown in FIG. 4 the MPEG encoder 340 has a direct connection to the digital network 400 to provide MPEG encoded media data to the multimedia archive 200.

In a preferred embodiment, the media recorder 330 is implemented using an Avid Media Recorder™ available from Avid Technology Inc., Tewksbury, Mass.

The video editor 320 is a full-feature, digital, non-linear video editing workstation specifically tailored to provide functions for news editing. The video editor provides editing of high resolution broadcast quality images provided by the media server 350. In a preferred embodiment, the video editor is implemented using a an Avid NewsCutter™ or an Avid Media Composer®, both of which are available from Avid Technology Inc., Tewksbury, Mass. The digital playback system 310 is a digital, disk-based playback system that manages the broadcast to air of multimedia data produced and stored within the video production system 300. The digital playback system 310 plays materials stored either locally or on the media server 350 in accordance with play lists generated from a program lineup created on one of the journalist workstations 110 within the core newsroom system 100, or on a workstation directly coupled to the video production system (not shown). In a preferred embodiment of the invention, the digital playback system 310 is implemented using an Avid AirPlay® available from Avid Technology, Inc., Tewksbury, Mass.

The high bandwidth network 364 provides high speed communication between the components of the video production system 300. In a preferred embodiment of the invention, the high bandwidth network 364 is implemented using an ATM network as described in co-pending U.S. patent application Ser. No. 08/249,849, titled An Apparatus and Computer Implemented Process For Providing Real-Time Multimedia Data Transport in a Distributed Computing System, which is incorporated herein by reference. The high bandwidth network 364 supports real time playback of broadcast quality MJPEG video and multi-track audio over fiber optic networks.

The graphics workstation 370 is used for generating and editing graphics material for broadcast from and storage in the video production system. In a preferred embodiment, the graphics workstation 370 is implemented using a Matador Workstation available from Avid Technology, Inc., Tewksbury, Mass.

It should be understood that the media recorder 330 and the MPEG encoder 340 form a multimedia capture and encoding system, as illustrated in the embodiment of FIG. 3. In particular, the combination of the media recorder 330 and the MPEG encoder 340 captures multimedia data, and substantially simultaneously provides a first compressed version of the multimedia data having a first resolution (e.g., MPEG), and a second compressed version of the multimedia data having a second resolution (e.g., MJPEG) that is different than the first resolution.

It should be further understood that the graphics workstation 370 forms playback circuitry 60 of a video editing and playback system 56, as illustrated in FIG. 3. In particular, the graphics workstation plays compositions that use compressed versions of multimedia data stored in the media server 350. As will be described below, the compositions may be generated by the core newsroom system 100 using different compressed versions of multimedia data stored in the multimedia archive system 200.

CORE NEWSROOM SYSTEM 100

The core newsroom system 100 consists primarily of a number of journalist workstations 110 and a pair of news servers 120. FIG. 10 shows a newsroom system having three journalist workstations 110. In embodiments of the invention, the number of workstations 110 actually used may be much greater than three, and the actual number of journalist workstations 110 that may be used in the system is based on several factors including the amount of network activity generated by each user of the workstations and by the amount of delay each user will tolerate in accessing the system.

In a preferred embodiment of the invention, each of the journalist workstations 110 is implemented using an MPC III compliant workstation.

The journalist workstation 110 provides access to multimedia data from a variety of sources and includes the tools (i.e. software) necessary to create a multimedia storyboard of a news story for broadcast. The multimedia data available to the journalist includes the low resolution MPEG video data captured by the media recorder. In one embodiment of the invention, each of the journalist workstations 110 includes a video port for receiving video from, for example, a VTR. Each of the journalist workstations 110 also includes a serial port for controlling the VTR. The graphics user interface of the journalist workstation 110 and the functions available to a user of the journalist workstation 110 are described in greater detail below.

The news server 120 provide management and storage of the multimedia data in the newsroom environment. The news servers 120 are configured as distributed processors with mirrored data bases to provide maximum reliability and performance. Other centralized functions, such as communications functions, are managed by the news servers 120. In a preferred embodiment, the news servers 120 are implemented using an Avid NewsServer available from Avid Technology, Inc., Tewksbury, Mass. The news servers 120 have external connections 122 for providing access to news wire services and to allow remote access to the news servers 120 from users external to the core newsroom system.

The core newsroom system 100 may also include one or more terminal servers 140 to provide connection to the digital network 400 for user terminals 130. The user terminals may be one of several different terminals used in prior art systems primarily for text processing and communications functions. A device controller 150, or a number of device controllers 150, may also be coupled to the digital network 400 to provide control of several multimedia devices, such as teleprompters, from the journalist workstations.

It should be understood that a journalist workstation 110 of the core newsroom system 100 in combination with a graphics workstation 370 of the video production system 300 form of a video editing and playback system 76, as illustrated in the embodiment of FIG. 3. The journalist workstation 110 forms editing circuitry 58 that generates a composition that uses a portion of a first compressed version of multimedia data having a first resolution. As stated above, the graphics workstation 370 forms playback circuitry 60 that plays the composition using a portion of a second compressed version of the multimedia data stored in the media server 350.

MULTIMEDIA ARCHIVE SYSTEM 200

The multimedia archive (MMA) 200 includes a library server 210 and one or more object servers 220. The library server 210 holds catalog and search support meta data for locating objects stored in the multimedia archive 200.

The object server 220 provides the primary storage media for browsing and archival of material generated during news gathering and production processes. The object server 220 works in conjunction with the library server 210 to facilitate distribution of multimedia material to the journalist workstations 110. The objects stored in the multimedia archive can be low resolution versions of video, audio, graphics, and text. The MMA can be used to store finished stories, audio, video and other content for reuse in creating new stories. In a preferred embodiment, the multimedia archive 200 is implemented using the IBM Digital Library 5765-258.

It should be understood that the multimedia archive system 200 in combination with the media server 350 of the video production system form a multimedia storage system 54, as illustrated in the embodiment of FIG. 3. The multimedia archive system 200 and the media server 350 are coupled to the media recorder 330 and the MPEG encoder 340 that form the multimedia capture and encoding system 52, and are further coupled to the journalist workstations 110 and the graphics workstation 370 that form the video editing and playback system 56. The multimedia archive system 200 and the media server 350 store multimedia information including the first and second compressed versions of the multimedia data, which are described above.

OPERATION OF THE NEWSROOM PRODUCTION SYSTEM 90

The operation of the digital multimedia newsroom production system 90 shown in FIG. 10 is described below. The operation of the system 90 can be described as a collection of distinct function specific workloads characterized at a high level as asset creation, asset use, asset storage, and asset administration. The system 90 provides the capability for the following functions:

- News wire text capture, storage, and catalog;
- News story text creation, storage, and catalog;
- High resolution video capture, edit, playout, storage and catalog;
- Video production system low resolution media data editing;
- Real-time dual resolution digitization, storage and catalog;
- Low resolution video browsing and editing; and
- High-resolution playout and editing of low resolution composition Each of the functions described above, along with user interfaces for accomplishing these functions, are described below in greater detail.

News Wire Text Capture, Storage and Catalog

The news servers 120 provide capability for capture and storage of news wire text data through the external interfaces 122. News wire text stories are captured by the news servers 120 and cataloged in a database of the news servers 120. A user of one of the journalist workstations 110 may access the news servers databases as a system librarian to search, browse and retrieve the wire service data stored in the databases of the news servers 110. It is not generally necessary to store all text stories captured by the news servers 110 in the multimedia archive 200. A system administrator may access the news servers through one of the journalist workstations 110, browse the catalog of data received from the news wires, determine what stories are appropriate for storage in the multimedia archive 200 and command the news servers 120 to transfer selected data to the multimedia archive 200 for storage.

News Story Text Creation, Storage. and Catalog

A user of the journalist workstation 110 can access text through the news servers 120 and can create text and scripts from scratch or can use existing text and scripts stored in the news servers 120 or in the multimedia archive 200 in the creation of text and scripts. The user can search, browse and retrieve text data stored in the news servers 120 and the multimedia archive 200. The user can perform this searching and browsing using complex, full-text search techniques, thereby allowing efficient research by focusing the searching to retrieve data specifically relevant to the user's needs.

High Resolution Video Capture, Edit, Playout, Storage and Catalog

High resolution media data utilized by the video production system is captured in the system by the media recorder 330. The high resolution media data is captured in the media recorder 330, digitized and compressed using a broadcast quality compression technique such as MJPEG. The media data captured by the media recorder 330 is transferred in compressed form to the media server 350 and is registered and stored in the media server 350 by the asset manager 360. As discussed further below, in a preferred embodiment of the invention, a low resolution version of the media data is simultaneously created with the high resolution media data.

The high resolution media data can be browsed and edited using the video editor 320 and can be broadcast to air using the digital playback system 310.

Video Production System Low Resolution Media Data Editing

As discussed above, low resolution video is used by the journalist workstations 110 to provide limited editing capability. A user of the video production system 300, for example a user of the video editor 320, may wish to edit low resolution media data. The low resolution media data may either be a low resolution composition created by a user of a journalist workstation 110 or a low resolution version of media data captured by the media recorder 330. In either case, the video production system 300 user may search the multimedia archive 200 over the network 400 or may search the asset manager 360 over the network 400 to retrieve the low resolution media data. After editing the low resolution media data, the video editor 320 may transfer edited low resolution media data to the multimedia archive 200 for cataloging and storage therein.

Real-time Dual Resolution Digitization, Storage and Catalog

As described above, news video production from the journalist workstation 110 requires that an editable form of media data be available to a user of the journalist workstation 110. The low resolution media data is stored in, cataloged by and retrieved from the multimedia archive 200. The low resolution media data is captured in the system 90 using the media recorder 330. The media recorder 330 performs a dual resolution digitization of media data to be captured by the system 90.

When media data is captured, the media recorder 330, in conjunction with the MPEG encoder 340, performs a dual resolution digitization of the media data to simultaneously produce a high resolution version of the media data and a low resolution version of the media data. As discussed above, the high resolution version of the media data is digitized and compressed in a preferred embodiment using an MJPEG encoding format. The low resolution video is compressed in a preferred embodiment using known, high compression encoding techniques such as MPEG or Quick Time, available from Apple Computer, Inc, Cupertino, Calif. Although it is preferred to use either MPEG or Quick Time, another compression technique which results in a high compression ratio of the media data may also be used. By performing simultaneous capture of both the high resolution version and the low resolution version of the media data, both forms of media data are immediately available in the system 90 so that story editing can be performed to meet the stringent deadlines encountered in broadcast news operations even with late breaking material.

Low Resolution Video Browsing and Editing

One of the primary features of the system 90 shown in FIG. 10 is the ability to provide a user of the journalist workstations 110 with low resolution video to allow browsing and editing of the low resolution video to create storyboards which may ultimately be used by an editor using the video editor 320 to create broadcast quality media data. The low resolution editing feature allows the journalist to become more involved in the finished media product and to incorporate archived media data into storyboards without the need for manual retrieval of video tapes and operation of a video tape player in an edit bay as in previous systems.

A journalist, using the journalist workstation 110, can search the data contained within the library server 210 of the multimedia archive 200 for low resolution video data, audio data and text related to a story that the journalist is composing on the journalist workstation 110. In response to key search words provided by the journalist, the multimedia archive provides a list of material contained therein related to the key words. The journalist can then select media data for browsing or editing on the journalist workstation 110 from the list of material.

Figure 11:
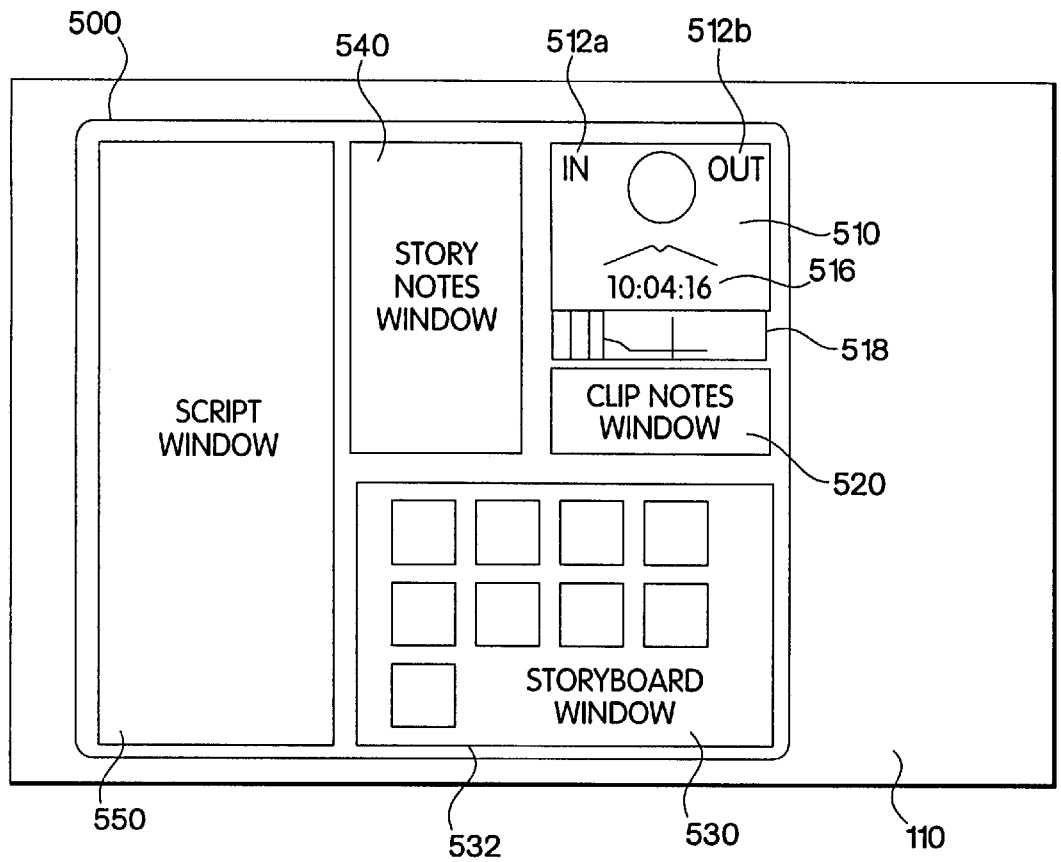
FIG. 11 is a view of a graphics user interface of a digital multimedia newsroom production system according to an embodiment of the present invention.

The graphics user interface for storyboard creation provided to the journalist at the journalist workstation 110 is shown in FIG. 11. The user interface 500 includes a number of windows including a viewing window 510, a clipnotes window 520, a storyboard window 530, a storynotes window 540 and a script window 550.

The script window 550 provides an area in which the journalist can write the main script of a story being composed on the journalist workstation 110. Text can be generated in this window using standard word processing commands. Graphics, including painting functions, can be performed on the journalist workstation 110 and incorporated into the storyboard.

The viewing window 510 displays a low resolution video component of low resolution media data to be viewed and edited on the journalist workstation 110. The viewing window also displays the time code 516 of the video being displayed, machine controls 518, and editing functions such as mark in 512a and mark out 512b buttons. The machine controls 518 provide controls for playing a video clip in the viewing window and are similar to standard VTR controls. The machine controls can be selected by the user using a pointing device, such as a mouse, or by using special function keys on a keyboard of the journalist workstation 110. Selecting a clip for display in the viewing window may be done by dragging a clip from the storyboard window 530 (described below) or by selecting a new clip from the multimedia archive 200.

A second viewing window can be opened on the screen at the same time as the viewing window 510. The second viewing window, in a preferred embodiment, is made visible by either shrinking or eliminating the storynotes window 540.

The mark in button 512a and the mark out button 512b are super-imposed in the upper left and upper right corners of the viewing window. These buttons are used to perform editing functions at the journalist workstation 110. When a video clip is being played in the viewing window 510, audio data associated with the video data is played on speakers of the journalist workstation 110. A "video only" or "audio only" indication will appear on the video window when the media data being displayed or played on the workstation consists of audio only or video only.

The clipnotes window 520 provides a note pad for entry of short notes for each clip viewed on the viewing window 510. The storynotes window 540 provides an area for the entry of notes that apply to the whole story to be edited as opposed to the clipnotes window 510 which is for notes on individual clips.

The storyboard window 530 allows clips and subclips to be laid out in sequence. Each of the clips 532 shown in the storyboard window 530 typically show the first frame of a corresponding clip, however, the user may select a frame other than the first frame to be shown in the storyboard window. The collection of clips stored in the storyboard window are referred to as a bin. The journalist has the option of playing one of the clips in the viewing window or playing the bin of clips as arranged in the storyboard window.

The final pre-edited composition contained on the journalist workstation 110 may be transferred to the multimedia archive 200 for reuse by the journalist or other journalists on other journalist workstations 110 and for final editing and playout by a user of the video production system 300.

High Resolution Playout and Editing of Low Resolution Compositions

A composition produced during a low resolution activity on a journalist workstation 110 may be played out in different ways. A user of a journalist workstation 110 may play the low resolution composition by retrieving the composition data from the multimedia archive 200, or a user of the video production system 300, for example a user of the video editor 320, may play and edit a high resolution version of the composition. The translation of the low resolution composition to its high resolution equivalent is transparent to the user of the video editor 320. The asset manager 360 using registration information of each of the low resolution sources used in the composition can identify the equivalent high resolution sources and translate the low resolution composition into its high resolution equivalent. Efficient translation by the asset manager 360 requires a unique registration system for each of the clips stored within the system. Further, the registration method must include means for identifying the corresponding high resolution version of low resolution media data. A preferred registration method is described in detail further below.

An editor, using the video editor 320, receives the high resolution version of the low resolution composition created by the journalist, and can further edit the composition in broadcast quality format, to provide more precise editing cuts than accomplished by the journalist.

Figure 12:
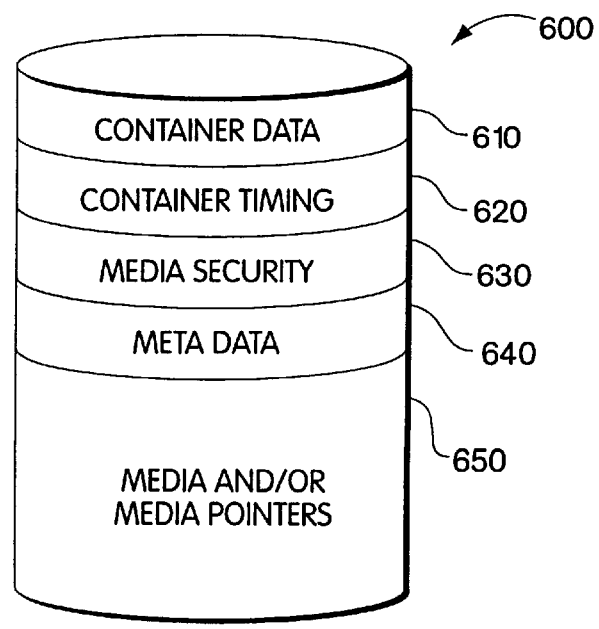
FIG. 12 is a diagram of a multimedia file structure according to an embodiment of the present invention.

In order to provide efficient transmission and storage of media data in the system shown in FIG. 10, a standard file structure is used for the media data contained within the system. In one embodiment of the invention, the media data is organized in a media container 600 as shown in FIG. 12. The media container 600 is divided into five subsections including container data 610, container timing 620, media security 630, meta data 640 and media or media pointers 650.

The information contained within the container data 610 describes the container itself and may include the following information: the name of the person that created the container data; the name of the person that approved the container data; an identification of the container security; a creation time stamp; the name of all people that have modified the data; a modification time stamp; a user's log; cost information associated with the data; and other user defined elements.

Container timing 620 includes information related to a relationship over time of the media in the container. This information is only applicable to a story being prepared for broadcast.

The media security segment 630 provides further information concerning the security level of the media contained within the container. This information can be used to restrict access to specified personnel of media contained within the container.

The meta data information describes the media stored in the container. In one embodiment, the meta data contains the following information for each media object in the container: the name of the person that approved the data; the name of the person that created the data; a creation time stamp; a media identifier; media status; media type; names of all people that have modified the data; a modification time stamp; a reference number; research descriptors; timing information; title; and other user defined elements.

The media and media pointers 65 are the actual raw data stored in the container. Media objects of many types may be stored in a single container. The media pointers point to a media object stored in another container. By storing a media pointer to another container, rather than the media of the other container itself, maximum storage efficiency can be attained throughout the system.

File structures, other than the container file structure described above, may be used for storing the media data in the digital multimedia newsroom production system. For example, the Open Media Framework (OMF™) file structure, described in Avid Technology, Inc. publication OMF™ Interchange Specification, which is incorporated herein by reference, may be used as the file structure for media files in the system. The file structure described in Published PCT Application WO 93/21636, A Method and Apparatus For Representing and Editing Multimedia Compositions, incorporated herein by reference, may also be used in embodiments of the invention.

Another feature of the system shown in FIG. 10 is the ability to uniquely identify the media objects stored within the system and to locate other versions of media data that correspond to the media objects. The ability of the system 90 to locate a high resolution version of media data, corresponding to a low resolution version of the same media data, allows the asset manager 360 to provide a high resolution translation of combinations or storyboards generated by the journalist workstation 110, such that the translation is transparent to an editor using the video editor 320.

The asset manager can uniquely identify the low resolution and high resolution media data in a number of ways. In one embodiment of the invention, the media data, when captured by the media recorder 330, is assigned a unique time code stamp corresponding to the date and time that the media data is captured by the media recorder 330. Using this scheme, the low resolution version of the media data and the high resolution version of the media data is assigned the same identification number. However, since the low resolution media data is stored in the multimedia archive 200, and the high resolution media data is stored in the media server, there is no opportunity for confusion between the versions of the media data. The asset manager, in translating a combination or storyboard from a low resolution version to a high resolution version, can locate the high resolution version of each media object of the combination in the media server based on the identification number of the corresponding low resolution version of the media object. The above-described media data identifying method is not preferred for use at broadcast locations that do not maintain a unique timecode stamp.

In one embodiment of the invention, the asset manager 360 may be implemented using Media File Manager (MFM) and Source Manager (SM) software as described in U.S. Pat. No. 5,267,351 to Reber et al which is incorporated herein by reference. This software provides a unique identifier to media data captured by the system and maintains a table of relationships between media objects contained within the system such that the asset manager 360 can identify a corresponding version of low resolution or high resolution media data.

In an alternate embodiment of the invention, a digital multimedia newsroom production system consists only of the core newsroom system 100 and the multimedia archive system 200 coupled by the digital network 400. In this alternate embodiment, a low resolution capture device is coupled to the network 400 to capture low resolution media data for storage in the news servers 120 and the multimedia archive system 200. In this embodiment, the journalist workstations 110 provide the full storyboard functions described above with respect to the system 90 shown in FIG. 10.

Embodiments of the invention overcome limitations of prior art systems by providing a fully integrated digital multimedia newsroom. In embodiments of the invention, a journalist in a newsroom may create a multimedia storyboard of a news story which is electronically transferred over a digital network to an editing and production system for final editing and broadcast to air. Embodiments of the invention have been described with respect to a multimedia production system in a newsroom environment, however, embodiments of the invention are not limited to a newsroom environment, but rather may be used in other multimedia environments as well, such as radio, and in the production of entertainment programming.

In embodiments of the invention described above, the multimedia data processed on the journalist workstation 110 has been described as low resolution multimedia data. The user interface provided by the journalist workstation 110 may also be used to create storyboards using high resolution multimedia data.

Furthermore, the embodiments have been described in a newsroom context. However, the invention may be applied anywhere in the movie, television and cable industry, where multimedia data, and particularly, motion video data, is to be processed. In particular, the invention is suitable for active movie systems, video conferencing, and cable pay per view systems.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description by way of example only, it is not intended as limiting. The invention's limit is defined only in the claims and the equivalents thereto.

What is claimed is:

1. A multimedia system, comprising:
    a multimedia capture and encoding system that captures multimedia data, and substantially simultaneously provides a compressed version of the multimedia data having a first resolution;
    a multimedia storage system, coupled to the multimedia capture and encoding system, that stores multimedia information including the compressed version of the multimedia data, and provides to a network the compressed version of the multimedia data substantially simultaneously as the compressed version is stored; and
    a video host coupled to the network, that sends a first request to the server for a first portion of the compressed version of the multimedia data, determines an amount of time to wait based on a length of the first portion and a response time of the first request, and sends a second request to the server for a second portion of the compressed version of the multimedia data after waiting the determined amount of time.

2. The multimedia system of claim 1, wherein the multimedia system includes a server coupled to a network, that sends the encoded version of the multimedia data on the network in multicast form.

3. The multimedia system of claim 1, wherein the multimedia system includes a server coupled to a network, that sends the encoded version of the multimedia data on the network in response to a request from a video host.

4. The multimedia system of claim 1, wherein the multimedia storage system stores the compressed version of the multimedia data in a file.

5. The multimedia system of claim 4, wherein the multimedia storage system stores the compressed version of the multimedia data in a file by appending to a compressed version of multimedia data stored in the file.

6. The multimedia system of claim 4, wherein the multimedia storage system stores the compressed version of the multimedia data in a file by storing the compressed version of the multimedia data to a computer data file on a computer readable and writable random access medium.

7. A multimedia system, comprising:
    means for capturing multimedia data and substantially simultaneously providing a compressed version of the multimedia data having a first resolution;
    means for storing multimedia information including the compressed version of the multimedia data and providing to a network the compressed version of the multimedia data substantially simultaneously as the compressed version is stored;
    means for sending a first request to the server for a first portion of the compressed version of the multimedia data;
    means for determining an amount of time to wait based on a length of the first portion and a response time of the first request; and
    means for sending a second request to the server for a second portion of the compressed version of the multimedia data after waiting the determined amount of time.

8. The multimedia system of claim 7, wherein the multimedia system further includes means, coupled to a network, for sending the encoded version of the multimedia data on the network in multicast form.

9. The multimedia system of claim 7, wherein the multimedia system further includes:
    means, coupled to a network, for receiving a request from a video host; and
    means, coupled to the network, for sending the encoded version of the multimedia data video to the video host in response to the request.

10. The multimedia system of claim 9, wherein the means for storing comprises means for storing the compressed version of the multimedia data to a file.

11. The multimedia system of claim 10, wherein the means for storing the compressed version of the multimedia data to a file includes means for appending to a compressed version of multimedia data stored in the file.

12. The multimedia system of claim 10, wherein the means for storing the compressed version of the multimedia data to a file comprises means for storing the compressed version of the multimedia data to a computer data file on a computer readable and writable medium.

13. A method for use in a multimedia system, the method comprising:
    capturing multimedia data and substantially simultaneously providing a compressed version of the multimedia data having a first resolution;
    storing multimedia information including the compressed version of the multimedia data and providing to a network the compressed version of the multimedia data substantially simultaneously as the compressed version is stored;
    sending a first request to the server for a first portion of the compressed version of the multimedia data;
    determining an amount of time to wait based on a length of the first portion and a response time of the first request; and
    sending a second request to the server for a second portion of the compressed version of the multimedia data after waiting the determined amount of time.

14. The method of claim 13, further comprising sending the encoded version of the multimedia data on a network in multicast form.

15. The method of claim 13, further comprising:
    receiving a request over a network from a video host; and sending the encoded version of the multimedia data video over the network to the video host in response to the request.

16. The method of claim 13, wherein the storing comprises storing the compressed version of the multimedia data to a file.

17. The method of claim 16, wherein the storing the compressed version of the multimedia data to a file includes appending to a compressed version of multimedia data stored in the file.

18. The method of claim 17, wherein the storing the compressed version of the multimedia data to a file includes storing the compressed version of the multimedia data to a computer data file on a computer readable and writable medium.

19. A computer program product comprising:

a computer readable medium; and information stored on the computer readable medium indicative of a program to be executed by a computer to carry out the method of:

capturing multimedia data, and substantially simultaneously providing a compressed version of the multimedia data having a first resolution;

storing multimedia information including the compressed version of the multimedia data and providing to a network the compressed version of the multimedia data substantially simultaneously as the compressed version is stored;

sending a first request to the server for a first portion of the compressed version of the multimedia data;

determining an amount of time to wait based on a length of the first portion and a response time of the first request; and sending a second request to the server for a second portion of the compressed version of the multimedia data after waiting the determined amount of time.

20. The computer program product of claim 19, wherein method the further comprises sending the encoded version of the multimedia data on a network in multicast form.

21. The computer program product of claim 19, wherein method the further comprises:

receiving a request over a network from a video host; and sending the encoded version of the multimedia data video over the network to the video host in response to the request.

22. The computer program product of claim 19, wherein the storing comprises storing the compressed version of the multimedia data to a file.

23. The computer program product of claim 22, wherein the storing the compressed version of the multimedia data to a file includes appending to a compressed version of multimedia data stored in the file.

24. The computer program product of claim 22, wherein the storing the compressed version of the multimedia data to a file comprises storing the compressed version of the multimedia data to a computer data file on a computer readable and writable medium.

* * * * *